United States Patent [19]

Kouya et al.

[11] Patent Number: 5,430,119
[45] Date of Patent: Jul. 4, 1995

[54] STRETCHED MOLDED ARTICLE OF ULTRA-HIGH-MOLECULAR WEIGHT POLYPROPYLENE AND PROCESS FOR THE PREPARATION OF THE SAME

[75] Inventors: Masahiro Kouya; Kazuo Yagi, both of Waki; Akio Fukui; Masahiro Ogawa, both of Toyota, all of Japan

[73] Assignee: Mitsui Petrochemical Industries, Ltd., Tokyo, Japan

[21] Appl. No.: 332,490

[22] Filed: Oct. 31, 1994

Related U.S. Application Data

[63] Continuation of Ser. No. 106,799, Aug. 16, 1993, abandoned, which is a continuation of Ser. No. 896,577, Jun. 10, 1992, abandoned.

[30] Foreign Application Priority Data

Jun. 11, 1991 [JP] Japan .................................. 139057

[51] Int. Cl.$^6$ ........................ C08F 10/06; C08F 110/06
[52] U.S. Cl. ............................ 526/348.1; 526/351; 264/210.7; 264/288.4
[58] Field of Search ..................... 526/348.1, 351; 264/210.7, 288.4

[56] References Cited

U.S. PATENT DOCUMENTS

| | | |
|---|---|---|
| 4,344,908 | 8/1982 | Smith et al. |
| 4,413,110 | 11/1983 | Kavesh et al. ................... 524/462 |
| 4,536,536 | 8/1985 | Kavesh et al. ................... 524/462 |

FOREIGN PATENT DOCUMENTS 56-15408  2/1981  Japan.
63-249711 10/1988  Japan.

OTHER PUBLICATIONS

Journal of Chemical Engineering, vol. 39, p. 929 (1939).
Polymer Bulletin 1, 733–736 (1979).
Fiber and Industry, vol. 40, No. 6, pp. 407–418 (1984).
Journal of Applied Polymer Science, vol. 28, pp. 179–189 (1983).
Polymer Communications, vol. 25, pp. 39–42 (1984).
Journal of Japan Rheology Society, vol. 13, No. 1, pp. 4–15 (1985).
Fiber and Industry, vol. 30, No. 1, pp. 18–21 (1974).
Fiber and Industry, vol. 36, No. 4, pp. 50–57 (1980).
Journal of Japan Fiber Society (Drafts in the annual convention for reading research, 1987).

*Primary Examiner*—David W. Wu
*Attorney, Agent, or Firm*—Sherman and Shalloway

[57] ABSTRACT

A stretched molded article of ultra-high-molecular-weight polypropylene having an intrinsic viscosity [$\eta$] of at least 4 dl/g, which has a degree of orientation of not less than 0.930 when obtained as a degree of orientation by an X-ray diffraction half-width, two or more of peak positions (melting points) within the temperature region of not lower than 180° C. when measured by a differential scanning calorimeter, and an amount of output energy of not less than 1 kgfm/g after 10-time repetition under a load of 50% of the breaking strength.

3 Claims, 1 Drawing Sheet

STRETCHED MOLDED ARTICLE OF ULTRA-HIGH-MOLECULAR WEIGHT POLYPROPYLENE AND PROCESS FOR THE PREPARATION OF THE SAME

This application is a continuation of application Ser. No. 08/106,799, filed Aug. 16, 1993, now abandoned; which is a continuation of application Ser. No. 07/896,577, filed Jun. 10, 1992, now abandoned.

FIELD OF THE INVENTION

The present invention relates to a high-orientation stretched molded article of ultra-high-molecular-weight polypropylene and a process for the preparation of the same, and more particularly to a stretched molded article of ultra-high-molecular-weight polypropylene (i.e., ultra-high-molecular-weight polypropylene stretched molded article) having specific physical properties and a process for the preparation of the same.

BACKGROUND OF THE INVENTION

It has been known that stretched molded articles having a high modulus and a high tensile strength can be obtained by forming fibers, tapes or the like from ultra-high-molecular-weight polyethylene and stretching them, and numbers of patents are laid open.

For example, Japanese Patent Laid-open Publication No. 56(1981)-15408 discloses a process for preparing a stretched molded article comprising the steps of spinning filaments from a dilute solution of ultra-high-molecular-weight polyethylene and then stretching the obtained filaments, that is, so-called "gel-spinning super-stretching process".

U.S. Pat. No. 4,413,110 and U.S. Pat. No. 4,536,536 disclose a process for preparing a stretched molded article comprising the steps of preparing a dilute solution of ultra-high-molecular-weight thermoplastic crystallized polymer using a non-volatile solution, subjecting the dilute solution to spinning to form xerogel fibers, and then stretching the xerogel fibers. This process is basically identical with the above-mentioned gel-spinning super-stretching process, but in this process, there can be obtained stretched molded articles of high modulus and high strength such as those having modulus of not less than 100 GPa and tensile strength of not less than 3 GPa when an ultra-high-molecular polyethylene is used.

With respect to the ultra-high-molecular polyethylene, as described above, a process for preparing fibers having high modulus and high tensile strength has been almost established, and its theory is explained in detail in Journal of Japan Rheology Society (Vol. 13, No. 1, pp. 4–15, 1985, written by Matsuo).

Utilizing the techniques on the ultra-high-molecular polyethylene, a variety of studies have been made in order to obtain fibers having high modulus and high tensile strength from ultra-high-molecular-weight polypropylene.

For example, Kunugi et al. have obtained polypropylene fibers having modulus of 16.9 GPa and tensile strength of 0.74 GPa by stretching polypropylene having a molecular weight of 475,000 under adoption of a zone stretching process which is successful in the polyethylene art to polypropylene (Journal of Applied Polymer Science, Vol. 28, pp. 179–189, 1983). The zone stretching process means a process comprising heating in a local heating furnace a 1–2 mm portion of a fiber having been beforehand prepared by means of a conventional melt spinning method or the like, and then stretching that portion of the fiber to effect super-stretching. Further, Peguy and Manley have reported an example in which the aforementioned gel-spinning super-stretching process is applied to polypropylene (Polymer Communications, Vol. 25 pp. 39–42, 1984). In concrete, they have obtained polypropylene fibers having modulus of 36 GPa and tensile strength of 1.03 GPa by subjecting a solution having a concentration of 0.75–1.5% by weight to the gel-spinning super-stretching process in the similar process to that adopted for the ultra-high-molecular polyethylene proposed by Smith and Lemstra (Journal of Polymer Bulletin, Vol. 1, p. 733, 1979).

Moreover, the aforementioned U.S. Pat. No. 4,413,110 and U.S. Pat. No. 4,536,536 disclose a working example for preparing polypropylene in addition to the above example for preparing polyethylene, and in concrete, there is described a process for preparing ultra-high-molecular-weight polypropylene fibers having modulus of 23.9 GPa and tensile strength of 1.04 GPa using a solution of ultra-high-molecular-weight polypropylene (intrinsic viscosity $[\eta]$: 18 dl/g, molecular weight: 3,300,000) having a concentration of 6% by weight.

However, when the ultra-high-molecular-weight polypropylene fibers or tapes obtained by utilizing the conventional processes for preparing ultra-high-molecular-weight polyethylene fibers are examined, the ultra-high-molecular-weight polypropylene stretched yarns or tapes obtained using any of those processes only show modulus of about 7–10 GPa and tensile strength of about 0.5–1.04 GPa.

By the way, it is known that the theoretical strength of the ultra-high-molecular-weight polyethylene is about 32 GPa, and that of the ultra-high-molecular-weight polypropylene is about 18 GPa, and the theoretical strength of the ultra-high-molecular-weight polypropylene is about ½ of that of the theoretical strength of the ultra-high-molecular-weight polyethylene ("Fiber and Industry", Vol. 40, pp. 407–418, 1984). At present, ultra-high-molecular-weight polyethylene fibers having tensile strength of about 6 GPa have been already obtained. For this value, the tensile strength, 0.5–1.04 GPa, of the ultra-high-molecular-weight polypropylene are not always satisfactory. That is, the tensile strength of the ultra-high-molecular-weight polypropylene should be improved to be 3 GPa, and taking the value into consideration, the tensile strength of the ultra-high-molecular-weight polypropylene now obtained is hardly improved.

An example of relatively successful processes in the improvement of the tensile strength of the ultra-high-molecular-weight polypropylene is a process reported by Kanamoto et al. (Journal of Japan Fiber Society, Drafts in the annual convention for reading research, 1987). This process comprises the steps of casting a solution of an ultra-high-molecular-weight polypropylene solution having a concentration of not more than 1% by weight and removing a solvent by means of evaporation to prepare a solvent-cast film, then subjecting the film to solid phase stretching in the pseudo melt state in such a manner that the film is sandwiched with a polyethylene buret from both sides, further stretching the film by about 6 times through a conical die, and finally subjecting thus stretched solid phase film to conventional stretching, so as to obtain highly stretched fibers having a draw ratio of about 72 times. This process uses the polyethylene buret as described above, so that a sample can be stretched in a high draw ratio without suffering any damage or break even if the sample is brittle. Concretely, in this process, an ultra-high-molecular-weight polypropylene stretched molded article having tensile strength of 2.3 GPa can be obtained using ultra-high-molecular-weight polypropylene having a molecular weight of 3,600,000.

In this process, however, the ultra-high-molecular-weight polypropylene is subjected to solid phase stretching using a conical die under the condition that the polypropylene is sandwiched with the buret, so that continuous manufacturing of fibers is difficult, resulting in disadvantages in industrial productivity and cost. Additionally, the ultra-high-molecular-weight polypropylene stretched molded article obtained by this process is extremely low in the elongation at break.

The ultra-high-molecular-weight polypropylene fibers can be generally manufactured by preparing a dilute solution of ultra-high-molecular-weight polypropylene, then spinning gel fibers from the solution and highly stretching the gel fibers.

In the case of utilizing the gel-spinning super-stretching process, however, the resulting fibers inevitably show high modulus, whereas the fibers are lowered in the elongation. Accordingly, when such fibers are intended to use as energy-regenerating elastic materials such as spring, the energy-regenerating time becomes markedly shortened because of their low elongation, so that the energy cannot be effectively stored and regenerated.

On the other hand, it has been known that fibers obtained by spinning under application of a temperature gradient and a shear stress thereto are subjected to heat treatment, so as to obtain hard elastic fibers capable of recovering elasticity without plastic deformation even after the fibers are deformed by near 100% (Fiber and Industry, Vol. 30, No. 1, pp. 18-21, 1974). As other example, it has been reported that hard elastic fibers having high elongation can be obtained by spinning fibers from polypropylene at a high speed and then subjecting the obtained fibers to heat treatment (Fiber and Industry, Vol. 36, No. 4, pp. 50-57, 1980). Furthermore, it has been reported that porous polypropylene fibers show an elongation of 40% and these fibers are suitable for energy-revival elastic materials (Japanese Patent Laid-open Publication No. 63(1988)-249711). However, the strength of these fibers are low.

In the above-described processes, heat treatment is necessarily effected in any of stages after the spinning stage, and this heat treatment is complicated, so that those processes are disadvantageous for industrially manufacturing stretched fibers having high strength and large elongation at break. In the heat treatment, moreover, the improvement in the elongation of fibers is limited to a certain level, and it is difficult to sufficiently increase an output energy value of the fiber formed from the ultra-high-molecular-weight polymer.

OBJECT OF THE INVENTION

The present invention is intended to solve the above-mentioned problems accompanied by the prior arts, and the object of the invention is to provide an ultra-high-molecular-weight polypropylene stretched molded article having a high tensile strength and a large elongation at break and further having a large amount of output energy.

SUMMARY OF THE INVENTION

The ultra-high-molecular-weight polypropylene stretched molded article of the invention is a stretched molded article made of ultra-high-molecular-weight polypropylene having an intrinsic viscosity $[\eta]$ of at least 4 dl/g, and the article has a degree of orientation of not less than 0.930 when measured as a degree of orientation by an X-ray diffraction half-width, two or more melting points within the temperature region of not lower than 180° C. when measured by a differential scanning calorimeter, and an amount of output energy of not less than 1 kgfm/g, preferably not less than 1.5 kgfm/g, after 10-time repetition under a load of 50% of the breaking strength.

The term "amount of output energy" used herein means the following. That is, a stress and an elongation of a sample are taken on the ordinate and the abscissa, respectively, on a recording paper for the tensile test (100%/min strain rate), and when a vertical line is drawn down from a point on a stress-strain curve corresponding to a 50% load of the break, an area enclosed with the vertical line, the abscissa and the stress-strain curve is the amount of output energy.

The ultra-high-molecular-weight polypropylene stretched article also has a tensile strength of not less than 0.7 GPa and an elongation at break of not less than 10%, and it shows high stability in the temperature range of −40° to 80° C.

The process for preparing an ultra-high-molecular-weight polypropylene stretched article of the invention comprises the steps of (i) extruding through a molding die or a nozzle an ultra-high-molecular-weight polypropylene composition composed of 15-80 parts by weight of ultra-high-molecular polypropylene having an intrinsic viscosity $[\eta]$ of at least 4 dl/g and 85-20 parts by weight of a diluent at a temperature at which the composition is flowable, (ii) taking up the extrudate in a draft ratio of at least 3 times and recrystallizing the ultra-high-molecular-weight polypropylene contained in the extrudate during or after the take-up procedure to form an unstretched orientation product, and (iii) stretching the unstretched orientation product at least once in a draw ratio of at least 3 times at a temperature of not lower than 90° C.

DETAILED DESCRIPTION OF THE INVENTION

Figure 1:
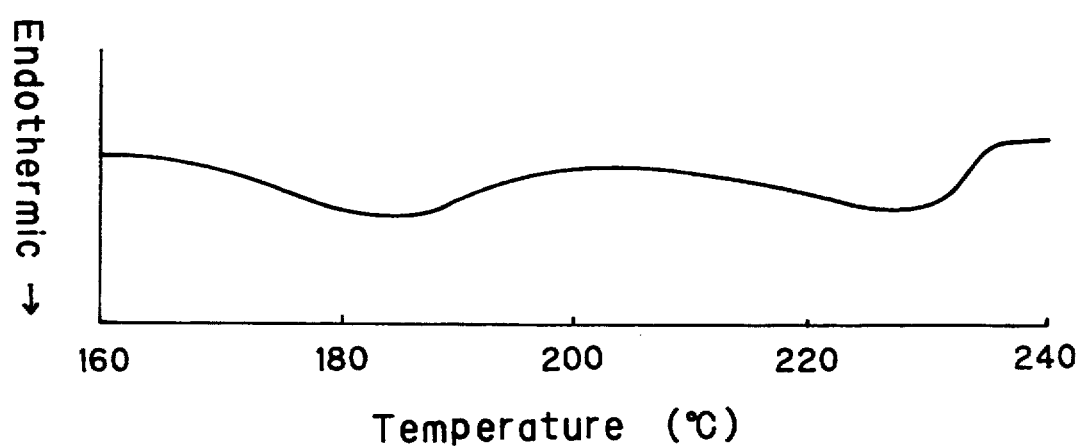
FIG. 1 is a graph showing melting points (peak position) of the ultra-high-molecular-weight polypropylene stretched molded article according to the invention measured by a differential scanning calorimeter.

The ultra-high-molecular-weight polypropylene stretched molded article and a process of making the article according to the invention are described below in detail.

The present invention is based on remarkable finding that a stretched molded article having a large amount of output energy having very stable temperature dependence characteristics and a high strength can be obtained by a process comprising the steps of subjecting to spinning a composition containing ultra-high-molecular-weight polypropylene having an intrinsic viscosity $[\eta]$ of at least 4 dl/g in a specific concentration, then stretching the resulting product while extracting the diluent, and further stretching the obtained product.

The term "temperature dependence characteristics of output energy" means temperature dependence of the output energy as obtained before, and in a practical use, the shape of the stress-strain curve, namely, the strength and the elongation at break, are preferred to be constant in a wide temperature range. As is observed in the aforementioned ultra-high-molecular-weight polyethylene, the strength is lowered in accordance with an elevation of temperature, and simultaneously the elongation at break becomes larger. In other words, the strength and the elongation at break have inverse correlationship therebetween for the temperature variation, so that the temperature properties of the output energy are apparently stable, but this is unfavorable in a practical use.

A theoretical ground to explain why the ultra-high-molecular-weight polypropylene stretched molded article obtained by the invention has an extremely large amount of output energy and the temperature dependence thereof is stable in the practically usable temperature range of −40° to 80° C. is not clear, but it is presumed that the ultra-high-molecular-weight polypropylene stretched molded article preferably has the following conditions as its structural conditions for the high strength and elongation at break and also the stability of the temperature dependence.

(i) The molecular chains are long.
(ii) The molecular chains are entangled to a certain degree, that is, a starting composition has a relatively high concentration of the ultra-high-molecular weight polypropylene.
(iii) The crystals per se are tough.

For satisfying those conditions, crystals of the polypropylene are linked to each other by van der Waals force, and this is the same as polyethylene. However, the polyethylene crystal has plain zigzag configuration, so that a polyethylene composition having a high concentration cannot be employed, and the resulting stretched molded article is brittle. On the other hand, the ultra-high-molecular-weight polypropylene has a spiral structure, so that the crystal thereof is relatively tough, and thereby a polypropylene composition having a high concentration can be employed. In the case of the ultra-high-molecular-weight polypropylene, the structure of the unstretched yarn prepared by crystallization under drafting is considered to be a key point, though the reason why a stretched molded article of high strength can be prepared from the composition of a high concentration is not clear.

Starting materials of the ultra-high-molecular-weight polypropylene employable in the invention, a process for preparing the polypropylene and a ultra-high-molecular-weight polypropylene stretched article are illustrated in order hereinafter.

Starting material

Examples of the ultra-high-molecular-weight polypropylene employable in the invention include propylene homopolymers and propylene copolymers obtained by means of coordination-anion polymerization of propylene and a small amount (for example, less than 10 mole %) of other α-olefins such as ethylene, 1-butene, 4-methyl-1-pentene, 1-pentene, 1-hexene, 1-octene and 1 decene. The ultra-high-molecular-weight polypropylene has an intrinsic viscosity [η] as measured in decalin at 135° C. of not less than 4 dl/g, preferably in the range of 7 to 15 dl/g. When the intrinsic viscosity [η] thereof is less than 4 dl/g, an excellent stretched molded article cannot be obtained even if the draft ratio is made large before the stretching procedure. There is no specific limitation on the upper limit of the intrinsic viscosity [η] thereof, but it is usually 15 dl/g. When the intrinsic viscosity [η] exceeds 15 dl/g, the ultra-high-molecular-weight polypropylene shows poor dispersibility, and a composition thereof having a high concentration shows an extremely high viscosity, causing melt fracture or the like, and thereby spinning stability thereof tends to deteriorate.

Preparation process

In the present invention, a composition is prepared by adding a diluent to the ultra-high-molecular-weight polypropylene, in order to make a spinning procedure using the ultra-high-molecular-weight polypropylene possible. Examples of the diluents include solvents capable of dissolving the ultra-high-molecular-weight polypropylene and various waxes capable of dispersing the ultra-high-molecular-weight polypropylene.

Concrete examples of such solvents include aliphatic hydrocarbon solvents such as n-nonane, n-decane, n-undecane, n-dodecane, n-tetradecane, n-octadecane, liquid paraffin and kerosine; aromatic hydrocarbon solvents such as xylene, naphthalene, tetralin, butyl benzene, p-cymene, cyclohexyl benzene, diethyl benzene, pentyl benzene, dodecyl benzene, bicyclohexyl, decalin, methylnaphthalene, ethylnaphthalene and hydrogenated derivatives thereof; halogenated hydrocarbon solvents such as 1,1,2,2-tetrachloroethane, pentachloroethane, hexachloroethane, 1,2,3-trichloropropane, dichlorobenzene, 1,2,4-trichlorobenzene and bromobenzene; and mineral oils such as paraffinic process oils, naphthenic process oils and aromatic process oils.

Suitable waxes include concretely aliphatic hydrocarbon compounds and derivatives thereof.

The aliphatic hydrocarbon compounds used herein are those mainly containing saturated aliphatic hydrocarbon compounds, and are called "paraffin waxes" generally having a molecular weight of not more than 2,000, preferably not more than 1,000, more preferably not more than 800. Concrete examples of the aliphatic hydrocarbon compounds include n-alkanes of 22 or more carbon atoms such as docosane, tricosane, tetracosane and triacontane; mixtures of these n-alkanes and a minor portion of lower n-alkanes; so-called paraffin wax obtained from petroleum by separation and purification; moderate or low-pressure polyethylene wax, high pressure polyethylene wax and ethylene copolymer wax, which are all low molecular weight polymers of ethylene or low molecular weight copolymers of ethylene and α-olefins; wax obtained from polyethylenes such as moderate or low-pressure polyethylenes and high pressure polyethylenes, whose molecular weight distribution has been decreased by heat degradation or the like; oxidation products of said waxes; maleic acid-modified oxidized wax; and maleic acid-modified wax.

The derivatives of the aliphatic hydrocarbon compounds used herein include, for example, aliphatic acid, aliphatic alcohol, aliphatic acid amide, aliphatic acid ester, aliphatic mercaptan, aliphatic aldehyde, and aliphatic ketone, which are such compounds as having at the terminal or inside the aliphatic hydrocarbon group (alkyl or alkenyl) 1 or more, preferably 1-2 and especially 1 functional group such as carboxyl, hydroxyl, carbamoyl, ester, mercapto or carbonyl, and having 8 or more carbon atoms, preferably 12-50 carbons atoms, or a molecular weight of 130-2,000, preferably 200-800. Concretely, useful aliphatic acids include capric acid, lauric acid, myristic acid, palmitic acid, stearic acid and oleic acid; aliphatic alcohols include lauryl alcohol, myristyl alcohol, cetyl alcohol and stearyl alcohol; aliphatic acid amides include capric acid amide, lauric acid amide, palmitic acid amide and stearylic acid amide; and aliphatic acid esters include stearyl acetate, etc.

The mixing proportion (weight ratio) of the ultra-high-molecular-weight polypropylene and the diluent varies depending upon the kinds thereof, but generally is in the range of 15:85 to 80:20, preferably 30:70 to 70:30. When the amount of the diluent is smaller than those defined above, the melt viscosity of the mixture becomes excessively high, thereby making difficult the melt kneading or melt molding thereof, and in addition, high strength cannot be attained because of poor stretching ability. The above-mentioned melt kneading is desirably carried out at a temperature of usually in the range of 170° to 300° C., preferably 190° to 270° C., and if the melt kneading is carried out at a temperature below the lower limit of the above range, the melt viscosity of the composition becomes excessively high, and the melt molding tends to become difficult. On the other hand, the melt kneading is carried out at a temperature above the upper limit of the above range, the molecular weight of the ultra-high-molecular-weight polypropylene decreases by heat degradation, and thereby a molded article of high strength can be hardly obtained. The mixing of the ultra-high-molecular-weight polypropylene and the diluent may be conducted by means of blending technique using a Henschel mixer, a V-blender, etc., or may be conducted by means of melt kneading using a single-screw or multi-screw extruder.

The composition composed of the ultra-high-molecular-weight polypropylene and the diluent is extruded through a molding die or a nozzle at a temperature at which the composition is kept to be flowable. In concrete, the composition is melt-extruded through a spinneret to obtain a filament for stretching, or the composition is extruded through a flat die or a ring die to obtain a film, a sheet or a tape for stretching. Otherwise, the composition is extruded through a circular die to obtain a pipe (parison) for stretch-blow molding.

The present invention is particularly useful for preparing stretched filaments, and in this case, the extrudate having been extruded through the spinneret is preferably drafted, that is, the extrudate is preferably extended in a molten state. The ratio of the extrusion speed Vo of a molten resin within the die orifice to the take-up speed V of an unstretched product having been cooled and solidified can be defined as a draft ratio by the following equation.

$$\text{Draft ratio} = V/Vo \tag{2}$$

The draft ratio as defined above, though it depends upon a temperature of the extrudate, a molecular weight of the ultra-high-molecular-weight polypropylene, etc., is usually 3 or more, preferably 6 or more.

In the invention, an unstretched molded article thus obtained from the ultra-high-molecular-weight polypropylene is subjected to stretching treatment. The stretching treatment of the ultra-high-molecular-weight polypropylene is carried out so that uniaxial molecular orientation is effectively given to the ultra-high-molecular-weight polypropylene of the molded article, that is, the stretching treatment is carried out at least once in a draw ratio of 3 times at a temperature of not lower than 90° C.

A heat medium employable for maintaining the unstretched molded article at the above-mentioned temperature includes air, water vapor or liquid media. It is, however, preferred that the stretching operation is carried out by using as the heat medium a solvent capable of removing the diluent and having a boiling point higher than that of the molded article composition, in concrete, decalin, decane, kerosine, etc., because it becomes possible to remove the diluent from the composition, and at the same time, to solve the problem of stretching irregularities and also to attain a high draw ratio.

Of course, the means for removing the diluent from the ultra-high-molecular-weight polypropylene is not limited to the above-mentioned procedure, and the removal of the diluent may also be carried out by a procedure of treating an unstretched article with a solvent such as hexane, heptane, hot ethanol, chloroform or benzene, followed by stretching, or a procedure of treating a stretched article with a solvent such as hexane, heptane, hot ethanol, chloroform or benzene. In this manner, the excessive diluent can be effectively removed from the molded article, and there can be obtained a stretched molded article having high strength and high output energy.

The stretching operation may be carried out in a single stage or two or more stages. The draw ratio depends upon the desired molecular orientation and the effect of improving a melting temperature followed thereby, but it is desirable that the stretching operation is carried out so as to attain the draw ratio of at least 3 times, normally 5–80 times, preferably 10–50 times.

In general, the multi-stage stretching operation is advantageous. In the first stage of the operation, the extrusion molded article is stretched at a relatively low temperature such as from 90° to 140° C. while extracting the diluent existing therein, and in the second and subsequent stages, the molded article is stretched at a temperature of not lower than 180° C., preferably in the range of 180° to 220° C.

In the case of uniaxial stretching operation such as uniaxial orientation of filaments, tapes, etc., a draw-stretching is conducted between rollers different in the circumferential speed, and further a biaxial orientation is also possible utilizing an inflation method or a method of combining with orientation in the crosswise direction using a tenter or the like.

The molecular orientation molded article obtained as above may be subjected, if desired, to heat treatment under restraint conditions or some shrinkage conditions. This heat treatment is carried out at a temperature of usually 140° to 180° C., especially 150° to 175° C., for 1 to 20 minutes, especially 3 to 10 minutes. By this heat treatment, there are brought about such advantages that crystallization of the orientated crystals is further proceeded, the melting temperature of the crystal is shifted to a higher temperature side, strength and modulus are improved, and creep resistance at high temperatures is enhanced.

Stretched molded article

The ultra-high-molecular-weight polypropylene stretched molded article obtained as above is formed from ultra-high-molecular-weight polypropylene having the aforementioned molecular weight, and in this article the molecules are conspicuously orientated in the lengthwise direction of fiber. The degree of the molecular orientation in the molded article can be confirmed by means of an X-ray diffraction method, a birefringence method, a polarization fluorescence method, etc. The stretched molded article of ultra-high-molecular-weight polypropylene according to the invention is characterized in that the degree of orientation measured by an X-ray diffraction half-width as detailed by Yukichi Go and Kiichiro Kubo, "Journal of Chemical Engineering", Vol. 39, p. 992 (1939), that is, a degree of orientation (F) as defined by the following equation:

$$\text{Degree of orientation } (F) = \frac{90° - H/2}{90°}$$

wherein H is a half-width (°) of intensity distribution curve along with Debye ring on a maximum paratope plane on the equatorial line and generally determined utilizing of reflection of crystal (110) or (040) in ultra-high-molecular-weight polypropylenes, is not less than 0.930, preferably not less than 0.950.

The ultra-high-molecular-weight polypropylene stretched molded article of the invention shows such high molecular orientation, and moreover, has an unexpected larger amount of output energy, namely, not less than 1 kgfm.g, preferably not less than 1.5 kgfm/g, more preferably, 2 kgfm.g, as compared with conventional high-molecular-weight orientation fibers. A degree of variability of the output energy value within the usable temperature region (0°–80° C.) is not more than 40%, preferably not more than 30%.

The ultra-high-molecular-weight polypropylene stretched molded article of the invention has a combination of high tensile strength and large elongation at break corresponding to the large amount of the output energy, and the tensile strength and the elongation at break corresponding to the amount of the output energy are not less than 0.7 GPa and not less than 10%, respectively, preferably not less than 0.9 GPa and not less than 15%, respectively, more preferably not less than 1.1 GPa and not less than 20% respectively.

Furthermore, the ultra-high-molecular-weight polypropylene stretched molded article of the invention has extremely higher melting point as compared with conventional polypropylene stretched molded articles, and the article of the invention is characterized in that two or more peak positions (melting points) measured by a differential scanning calorimeter are present within the temperature region of not lower than 180° C. preferably not lower than 182° C., more preferably not lower than 183° C.

In more concrete, the ultra-high-molecular-weight polypropylene stretched article of the invention has one peak position (melting point) within the temperature range of from 180° to 200° C. and other peak position (melting point(s)) within the temperature range of 210° to 230° C.

The peak position (melting point) is measured by a differential scanning calorimeter in the following manner. As the differential scanning calorimeter, DSC II type (produced by Perkin Elmer) is used. A sample of about 3 mg is wound around an aluminum plate having a size of 4 mm×4 mm and a thickness of 100 μm, to restrain the sample in the orientation direction. Then, the sample wound around the aluminum plate is enclosed in an aluminum pan to prepare a specimen. In a vacant aluminum pan which is usually introduced into a reference holder is enclosed the same aluminum plate as used above, to keep heat balance between the sample holder and the reference holder. The specimen is kept at 30° C. for about 5 minutes, and then the temperature of the specimen is elevated at 10° C./min, to measure a heat absorption curve. The peak position on the heat absorption curve is set to a melting point of the specimen.

The melting point of the stretched molded article existing within the temperature range of from 180° to 200° C. is symbolized as $Tp_1$, and the melting point thereof existing within the temperature range of from 210° to 230° C. is symbolized as $Tp_2$. Then, the points corresponding to 100° C. and 205° C., respectively, of the heat absorption curve are joined with a line (base line), and from an area enclosed with the base line and the melt curve is calculated an amount of melt heat ($Ap_1$) corresponding to $Tp_1$. Further, the points corresponding to 205° C. and 240° C., respectively, of the heat absorption curve are joined with a line (base line), and from an area enclosed with the base line and the melt curve is calculated an amount of melt heat ($Ap_2$) corresponding to $Tp_2$.

FIG. 1 is a graph showing peak positions (melting points) of the ultra-high-molecular-weight polypropylene stretched molded article according to the invention, which are measured by a differential scanning calorimeter. As is apparent from FIG. 1, the ultra-high-molecular-weight polypropylene stretched molded article of the invention has a first melting point within the temperature range of from 180° to 200° C. and a second melting point within the temperature range of from 210° to 230° C. A ratio between two of the melt heat amounts at the above-mentioned two melting points, that is, a ratio between two melt peak areas, preferably satisfies the condition of $Ap_1/Ap_2 \leq 1$, when the melt peak area based on the first peak position (melting point) is $Ap_1$ and the melt peak area based on the second peak position (melting point) is $Ap_2$.

EFFECT OF THE INVENTION

The ultra-high-molecular-weight polypropylene stretched molded article of the invention has a large amount of output energy and a high strength. Utilizing these properties, the ultra-high-molecular-weight polypropylene stretched molded article of the invention is useful as industrial textile materials such as high-strength multifilament, cord, rope, fabric and nonwoven fabric, and also as packing materials such as packing tape. Especially making the best of the high output energy properties, the ultra-high-molecular-weight polypropylene stretched molded article of the invention can be used for various products affected by great impact, for example, ropes for fishing such as float rope, culture rope, mooring rope and anchor rope; ropes for shipping such as hawser, tug rope, working sign rope, yacht rope and mooring rope; ropes used on land such as agricultural rope, working sign rope, loading rope for truck, sheet rope, tent-hem rope, tent-fixing rope and fixing line; ropes for marine leisure such as rope for water skis and rope for paraglider; ropes used on sea such as rope for fixing submarine-petroleum digging rig, pendant rope therefor, rope for digging of submarine-manganese deposit, rope for digging of hot water deposit and leading rope for construction of fishing bridge; nets made of said ropes for fishing such as drag-net, troll net, round hole net, set net, gill net and throw net; nets for protection such as safety net and protection net; and woven products such as safety belt, sailboat cloth and bulletproof cloth; etc.

EXAMPLE

The present invention is illustrated below with reference to examples, but it should be construed that the invention is in no way limited to those examples.

Example 1

A mixture of 30 parts by weight of ultra-high-molecular-weight polypropylene (intrinsic viscosity [η]: 7.75 dl/g) and 70 parts by weight of paraffin wax (melting point: 69° C. molecular weight: 490) was subjected to melt spinning under the following conditions. That is, to 100 parts by weight of the mixture was added 0.1 part by weight of 3,5-di-tert-butyl-4-hydroxytoluene as a process stabilizer, and then the mixture was melt-kneaded at a preset temperature of 220° C. using a screw extruder (screw diameter: 25 mm, L/D: 25, produced by Thermoplastic Co., Ltd). Subsequently, the obtained kneadate was subjected to melt spinning through a spinning die (orifice diameter: 2 mm) attached to the extruder. The obtained extrudate was taken up in a draft ratio of 35 times and an air gap of 180 cm, cooled at room temperature (23° C.) and solidified, to obtain unstretched fibers.

The unstretched fibers obtained as above were stretched under the following conditions. That is, the above-obtained unstretched fibers were stretched in four stages using 5 pairs of godet rolls and 4 stretching baths (usable bath length: 50 cm) placed between the godet rolls. The heat medium used in the first stretching bath was n-decane, and the fibers were stretched therein by 6 times at 100° C.; the heat medium used in the second stretching bath was n-decane, and the fibers were stretched therein by 7 times at 120° C.; the heat medium used in the third stretching bath was triethylene glycol, and the fibers were stretched therein by 10 times at 140° C.; and the heat medium used in the fourth stretching bath was triethylene glycol, and the fibers were stretched therein by 12 times at 160° C. In practicing the stretching, the rotation speed of the first godet roll was 0.5 m/min, and, the rotation speed of the second or the subsequent godet rolls was varied, to obtain stretched fibers having a desired draft ratio. The draw ratio was expressed by a ratio of the rotation speed of the first godet roll for supplying the fibers to the rotation speed of the second or the subsequent godet rolls for taking up the fibers. Almost all of the paraffin wax initially added was extracted in n-decane during the stretching process. Thereafter, the stretched fibers were washed with water, and dried at room temperature (23° C.) under a reduced pressure over a period of one day and night. The obtained stretched fibers were subjected to measurements on various physical properties. The results are set forth in Table 1 and Table 2.

Examples 2–10

The procedure of Example 1 was repeated except for varying the conditions to those set forth in Table 1. The results are set forth in Table 1 and Table 2.

TABLE 1

| Example | Viscosity [η] of UHMW Polypropylene | Amount of UHMW Polypropylene in Composition | Draft Ratio | Final Draw Ratio |
|---|---|---|---|---|
| 1 | 7.75 dl/g | 30 wt. % | 35 | 12 |
| 2 | 15.01 dl/g | 30 wt. % | 35 | 12 |
| 3 | 15.01 dl/g | 30 wt. % | 43 | 11 |
| 4 | 15.01 dl/g | 20 wt. % | 59 | 13 |
| 5 | 13.20 dl/g | 30 wt/ % | 28 | 12 |
| 6 | 19.00 dl/g | 20 wt. % | 20 | 15 |
| 7 | 7.00 dl/g | 30 wt. % | 46 | 14 |
| 8 | 15.20 dl/g | 20 wt. % | 22 | 13 |
| 9 | 7.00 dl/g | 50 wt. % | 40 | 9 |
| 10 | 6.01 dl/g | 50 wt. % | 42 | 10 |

Note:
The term "UHMW polypropylene" in Table 1 means Ultra-high-molecular-weight polypropylene.

TABLE 2

| Example | Fiber Diameter (denier) | Breaking Strength (GPa) | Modulus (GPa) | Elongation at Break | Amount of Output Energy (kgfm/g) | Degree of Orientation | $T_{p1}$ (°C.) | $T_{p2}$ (°C.) | $A_{p1}/A_{p2}$ |
|---|---|---|---|---|---|---|---|---|---|
| 1 | 21 | 0.70 | 6.72 | 22 | 2.10 | 0.960 | 183 | 215 | 0.83 |
| 2 | 17 | 1.06 | 9.86 | 21 | 2.32 | 0.970 | 185 | 223 | 0.80 |
| 3 | 22 | 0.98 | 8.99 | 24 | 3.70 | 0.958 | 185 | 218 | 0.82 |
| 4 | 13 | 1.08 | 9.48 | 22 | 2.60 | 0.970 | 186 | 220 | 0.76 |
| 5 | 27 | 1.10 | 10.38 | 22 | 2.93 | 0.972 | 187 | 225 | 0.72 |
| 6 | 19 | 0.98 | 12.82 | 19 | 2.73 | 0.975 | 186 | 227 | 0.74 |
| 7 | 19 | 0.85 | 10.40 | 19 | 2.21 | 0.973 | 185 | 223 | 0.76 |
| 8 | 12 | 1.04 | 12.25 | 20 | 3.37 | 0.972 | 186 | 226 | 0.73 |
| 9 | 46 | 0.87 | 6.23 | 36 | 3.05 | 0.952 | 184 | 217 | 0.82 |
| 10 | 28 | 0.84 | 6.07 | 32 | 2.88 | 0.950 | 183 | 216 | 0.85 |

What is claimed is:

1. A stretched molded article of ultra-high-molecular-weight polypropylene obtained by a process comprising:
   (i) extruding through a molding die or a nozzle an ultra-high-molecular-weight polypropylene composition composed of 15–80 parts by weight of ultra-high-molecular-weight polypropylene having an intrinsic viscosity (72) of from 4 dl/g to 19 dl/g, and 85–20 parts by weight of a diluent at a temperature at which the composition is flowable,
   (ii) taking up the extrudate in a draft ratio of at least 3 times and then recrystallizing the ultra-high-molecular weight polypropylene contained in the extrudate during or after the take-up procedure to form an unstretched orientation product, and
   (iii) stretching the unstretched orientation product at least once in a draw ratio of at least 3 times at a temperature of not lower than 90° C.;
   wherein said stretched molded article of ultra-high-molecular-weight polypropylene has a degree of orientation of not less than 0.930 when obtained as a degree of orientation by an X-ray diffraction half-width, two or more of peak positions (melting points) in the temperature range of from 180° C. to 230° C. when measured by a differential scanning calorimeter, an amount of output energy of from 1 kgfm/g to 3.70 kgfm/g after 10-time repetition under a load of 50% of the breaking strength, a tensile strength of from 0.9 GPa to 1.10 GPa and an elongation at break of from 21% to 36%.

2. The stretched molded article of claim 1, which is a fiber having breaking strength of from 0.98 to 1.10 GPa and an elongation at break of from 21 to 24%.

3. The stretched molded article of claim 1, which includes a first peak position in the temperature range of 180° C. to 200° C. and a second peak position in the temperature range of 210° C. to 230° C.

* * * * *

UNITED STATES PATENT AND TRADEMARK OFFICE
CERTIFICATE OF CORRECTION

PATENT NO. : 5,430,119
DATED : July 4, 1995
INVENTOR(S) : Kouya et al.

It is certified that error appears in the above-indentified patent and that said Letters Patent is hereby corrected as shown below:

Column 12, line 48, delete "(72)" and insert therefor -- (η) --.

Signed and Sealed this

Seventh Day of November, 1995

Attest:

BRUCE LEHMAN

Attesting Officer    Commissioner of Patents and Trademarks